United States Patent [19]

Matros et al.

[11] Patent Number: 4,978,519
[45] Date of Patent: Dec. 18, 1990

[54] PROCESS FOR PRODUCING ELEMENTAL SULPHUR

[76] Inventors: Jury S. Matros, ulitsa Zolotodolinskaya, 31, kv. 36.; Andrei N. Zagoruiko, ulitsa Tereshkovoi, 9, kv. 2.; Irina V. Malakhova, ulitsa Uchenykh, 8, kv. 12., all of Novosibirsk; Oleg G. Eremin, ulitsa Ostrovityanova, 19, kv. 16., Moscow, all of U.S.S.R.

[21] Appl. No.: 239,957
[22] PCT Filed: Jul. 27, 1987
[86] PCT No.: PCT/SU87/00083
§ 371 Date: Jun. 2, 1988
§ 102(e) Date: Jun. 2, 1988
[87] PCT Pub. No.: WO88/02736
PCT Pub. Date: Apr. 21, 1988

[30] Foreign Application Priority Data

Oct. 17, 1986 [SU] U.S.S.R. ............... 4131466
Oct. 17, 1986 [SU] U.S.S.R. ............... 4131457
Oct. 17, 1986 [SU] U.S.S.R. ............... 4131455

[51] Int. Cl.$^5$ ............................. C01B 17/04
[52] U.S. Cl. ................................. 423/574 R
[58] Field of Search ................ 423/574 R, 576

[56] References Cited

U.S. PATENT DOCUMENTS 4,303,633 12/1981 Thomsen ........................ 423/576
4,309,402 1/1982 Al-Muddarris ............. 423/574 R
4,315,904 2/1982 Lell et al. ....................... 423/576

FOREIGN PATENT DOCUMENTS 717026 10/1954 United Kingdom ........... 423/576

OTHER PUBLICATIONS

"CBA", Hydrocarbon Processing, Apr. 1979, p. 134.
"Sulfreen", Hydrocarbon Processing, Apr. 1979, p. 140.

Primary Examiner—Jeffrey E. Russel
Attorney, Agent, or Firm—Burgess, Ryan & Wayne

[57] ABSTRACT

The present invention relates to the production of elemental sulphur from sulphur dioxide and hydrogen sulphide by the Claus reaction.

To obtain elemental sulphur, into a catalyst bed divided into at least two parts the reaction gas having temperature of not less than 120° C. is introduced in the direction perpendicular to the cross-section along which the catalyst bed is divided. At least into one part of the catalyst bed sulphur dioxide and hydrogen sulphide are introduced at a temperature below the dew point of sulphur. Between parts of the catalyst bed resulting from its division intermixing and/or cooling of the reaction gas is effected. In at least one part of the catalyst bed the direction of supply of the reaction gas is reversed when the difference in temperatures of this gas at the inlet and outlet of the second part of the catalyst bed reaches 50°–150° C. Gaseous sulphur formed as a result of interaction of the reaction gas with the catalyst is withdrawn from the catalyst bed and subjected to a further condensation.

3 Claims, No Drawings

PROCESS FOR PRODUCING ELEMENTAL SULPHUR

FIELD OF THE ART

The present invention relates to a process for producing elemental sulphur from gases containing hydrogen sulphide and sulphur dioxide.

PRIOR ART

Among sulphur production processes most extensively used are those which are based on the known Claus reaction:

$$2H_2S + SO_2 \rightleftharpoons 3/nS_n + H_2O$$

which is thermally conducted at high temperatures (about 800°–1,400° C.) or catalytically at a temperature within the range of from 20° to 450° C. The Claus process is catalytically effected usually in a packed bed of a fluid (granulated) catalyst (gamma-alumina, bauxites) at a temperature of 120° to 450° C.

The gases to be processed are introduced into the catalyst bed at a temperature of 120°–400° C. at the volume ratio of hydrogen sulphide and sulphur dioxide of 2:1, whereafter the gases containing the formed sulphur are withdrawn from the catalyst bed and cooled to condense sulphur. The Claus reaction is reversible and, within the given temperature range, exothermal. The equilibrium degree of conversion of the starting gases into sulphur increases with lower temperature. However, at decreasing temperature condensation of sulphur in the catalyst bed is possible thus resulting in deactivation of the catalyst and slowing-down of the process.

When the process is conducted at a temperature above the dew point of sulphur (over 230°–250° C.) /cf. "Khimicheskaya Promyshlennost" Journal (Chemical Industry), 1965, No. 3, Yu. N. Brodsky, Preparation of sulphur from concentrated hydrogen-sulphide gases, p. 34 /, the equilibrium degree of conversion is not high, wherefore it is necessary to carry out the Claus reaction in several parallel catalyst beds—at least two of them, with cooling of the starting gases and condensation of the resulting sulphur between the catalyst beds followed by heating of gases to the reaction temperature. However, for this process it is necessary to use a large volume of the catalyst and many pieces of heat-exchanging equipment. The process incurs high operation costs connected with high hydraulic resistance of the unit in which the process is conducted and considerable power consumption for preheating of the gases between the catalyst beds. The process efficiency is low—in the case of two beds of catalyst the degree of conversion of the starting gases into sulphur does not exceed, as a rule, 94%.

When the process for producing sulphur is conducted at temperatures below the dew point of sulphur (cf. Sulfreen-Hydrocarbon Processing, 1979, v. 58, No. 4, p. 140), it becomes possible to reach a high degree of conversion (up to 99%) of the starting gases into sulphur in single bed of a catalyst; however, in this case it is necessary to regenerate the catalyst from time to time by evaporating sulphur condensed thereon by means of a stream of a hot regenerating gas. This process necessitates substantial power consumption for regeneration of the catalyst and has a low efficiency of processing of gases with a total volume concentration of sulphur compounds of above 2–3%.

Known in the art is a process for producing elemental sulphur (U.S. Pat. No. 4,303,402), wherein the process is conducted in two catalyst beds arranged in series so that into the first (along the path of the gases) catalyst bed the starting reaction gases are fed at a temperature below the dew point of sulphur, then the gases leaving this catalyst bed are heated and fed into the second catalyst bed at a temperature above the dew point of sulphur for evaporation of sulphur condensed thereon. As the second catalyst bed is freed from sulphur, the heating of gases between the catalyst beds is stopped and with a complete deactivation of the catalyst in the first bed the direction of the gas supply into the catalyst beds is reversed. This prior art process has a disadvantage residing in a low degree of conversion of the starting gases into sulphur upon increasing concentration (above 2% of $H_2S$) and at an elevated moisture content of the starting gases.

Also known in the art is a process for producing sulphur (U.S. Pat. No. 4,315,904), wherein the process is conducted in two series arranged catalyst beds between which beds the reaction gases are cooled to condense sulphur; into the first bed the reaction gases are delivered at a temperature above the dew point of sulphur and into the second bed—below the dew point of sulphur; prior to the entering the second bed of catalyst the reaction gases are mixed with a portion of the starting gas mixture. As the catalyst gets deactivated in the second catalyst bed, the direction of supplying the initial gases into the catalyst beds is reversed. The degree of conversion of the initial gases into sulphur in this process can be more than 99%, but with a higher concentration of gases and water vapor it is lowered and can be even insufficient for processing of moist gases with a medium and high (above 2% of $H_2S$) concentration of sulphur compounds.

Furthermore, there are known (cf. CBA-Hydrocarbon Processing, 1979, v. 58, No. 4, p. 134) combined processes of producing sulphur, wherein in the first catalyst the reaction is conducted at temperatures above the dew point of sulphur and in the subsequent catalyst the reaction is conducted at temperatures—below the dew point of sulphur with a discontinuous regeneration of the catalyst by means of a hot stream of the starting gases. Such processes feature a higher efficiency (the degree of conversion of up to 99.3%), but their implementation is associated with high capital investments and high rates of power consumption.

To avoid these difficulties, it has been suggested to perform the Claus process at low inlet gas temperatures with periodic reversal of the direction of the gas supply into the catalyst bed (SU, A, No. 911852). In this process, in the center of the catalyst bed a reaction zone is formed with a temperature (230°–300° C.) above the dew point of sulphur, while in cooler parts of the bed, through which the entering gases flow sulphur is condensed. These parts of the catalyst bed due to their catalytical inactivity serve as heat regenerators. The amount of sulphur condensed in the catalyst bed during the operation period between reversing of the direction of flow of the feed gases is equal to the amount of sulphur evaporated from the catalyst bed due to the heat evolved in the chemical reaction during the same period. Therefore, this process has the following advantages over the above-discussed processes;

a high degree of conversion of the starting gases into sulphur in a single bed of catalyst owing to a relatively low average temperature in the reaction zone and also due to the fact that a temperature profile is formed in the catalyst bed which drops in the direction of the outlet of the bed thus ensuring an additional increase of the degree of conversion (up to 99%).

continuous evaporation of the condensed sulphur by the heat evolved in the chemical reaction which provides a continuous process for producing sulphur without interruption for regeneration of the catalyst to remove liquid sulphur;

supply of the feed gases into the catalyst bed without a preliminary preheating which results in a substantial reduction of power consumption for the process.

All this ensures a substantial economic efficiency of the process.

However, in carrying out this process a low degree of conversion (90–92%) of the starting gases into sulphur is noted in processing of humid (20% of water and more) gases as well as gases with a high concentration (10% and more) of sulphur compounds due to impaired chemical equilibrium of the reaction.

A reduced efficiency of this process is also explained by a non-uniform distribution of the gas across the catalyst bed, as well as by deactivation of the catalyst by sulphates formed in the reaction zone at the above mentioned temperature on the catalyst surface in the case of presence of traces of oxygen in the starting gases.

The prior art process does not enable decomposition of sulphur-containing organic compounds ($COS$, $CS_2$) present in the composition of the starting gases due to carrying out of this process at a temperature insufficient for destruction of these compounds, wherefore the off-gases are contaminated with toxic substances. Furthermore, this process can be effected only with an increased volume of the catalyst due to the fact that during the process of sulphur production a portion of the catalyst bulk becomes inevitably deactivated with liquid sulphur.

SUMMARY OF THE INVENTION

It is an object of the present invention to provide a process for producing elemental sulphur from hydrogen sulphide which is stable and provides a high degree of conversion of a high hydrogen sulfide concentration and moist starting gas.

This object is accomplished by a process for producing elemental sulphur from sulphur dioxide and hydrogen sulphide carried out by introducing these gases into a catalyst bed with periodic reversing at the direction of supply of these gases, followed by withdrawing the resulting gaseous sulphur from the catalyst bed and condensation thereof. The process is conducted in a catalyst bed partitioned along its cross-section perpendicular to the direction of flow of the feed gases into at least two parts between which parts intermixing and/or cooling of the starting gases is effected along with removal of the resulting sulphur by condensation thereof. Into at least one part of the catalyst bed the gases are fed at a temperature below the dew point of sulphur and in at least one part of the catalyst bed periodic changing of the direction of supply of the initial gases is effected upon achieving a difference of the gas temperature at the inlet and outlet of this catalyst bed equal to 50°–150° C.

By the process according to the present invention, it is possible to raise the degree of conversion of high-concentration feed gases (for example a mixture of 10% of $H_2S$ and 5% of $SO_2$), by a relatively simple procedure, to sulphur to the value of 98.8%, as well as the degree of conversion of the starting gases with a high moisture content (e.g. 5% of $H_2S$, 2.5% of $SO_2$, 20% of $H_2O$) to sulphur to the value of 98.6%. It should be noted that the above-mentioned high conversion is maintained stable with time.

To attain a degree of conversion of 99.0–99.6% in processing of high-concentration and high-moisture content starting gases by a procedure than simpler than prior art procedures employed to ensure same level of the conversion, according to the present invention it is preferred to conduct the process in a catalyst bed partitioned along cross-sections perpendicular to the direction of supply of the starting gases into three parts so that into the first (along the direction of flow of the starting gases) part of the catalyst bed the starting gases are introduced at a temperature of 300°–400° C., while into the second and the third parts of the catalyst bed—at a temperature of 120°–160° C. and said reversing of the direction of flow of the starting gases is effected autonomously in the second part of the catalyst bed when the difference in temperatures of the above-mentioned gases at the inlet and outlet of the catalyst bed reaches 50°–150° C.; a centralized changing of the direction of supply of the starting gases into all parts of the catalyst bed is effected when the difference in temperatures of the gases at the inlet and outlet of the third part of the catalyst bed along the path of the gas movement is less than 0.1°–5° C.

To reduce the amount of the catalyst necessary to conduct the process for producing sulphur, according to the present invention it is necessary that admission and removal of the starting gases from at least one part of the catalyst bed be effected through beds of an inert material with a ratio of their volume to the volume of the catalyst bed equal to 1:0.5–2 respectively.

To ensure a high degree of conversion of the starting gases into sulphur, according to the present invention, in the case of presence of oxygen in the starting gases, which oxygen results in deactivation of the catalyst due to its sulfuration, it is preferred to carry out an additional changing of the direction of supply of the starting gases into the catalyst bed every 1,000 to 10,000 periods, when the temperature at the outlet from the catalyst bed exceeds that of the gas temperature at the inlet of the catalyst bed by 1°–25° C. and to increase the linear velocity of supply of the above-mentioned gases.

According to the present invention it is preferred to use quartz as the inert material.

To ensure a high degree of conversion of the starting gases into sulphur at a high level which is stable with time, it is preferred, according to the present invention, to additionally change the direction of flow of the feed gas in a period of from 10 to 100 minutes.

Further objects and advantages of the present invention will now become more fully apparent from the following detailed description of the process for producing elemental sulphur and examples illustrating its particular embodiments.

The production of elemental sulphur according to the present invention is effected from gases containing hydrogen sulphide and sulphur dioxide at an optimal ratio of their volume concentrations equal to 2:1. In the starting gases the presence of minor amounts of oxygen, as well as of organo-sulphur compounds (COS and CS$_2$) can be tolerated.

The production of elemental sulphur according to the present invention is based on the Claus reaction:

$$2H_2S + SO_2 \rightleftarrows 3/nS_n + 2H_2O$$

in a stationary bed of a solid granulated catalyst. As the catalyst use can be made of, e.g., γ-alumina, bauxites.

The starting reaction gases are fed into the reaction zone at a temperature of 120°–400° C.

The supply of the starting gases at a temperature above 400° C. is not preferred, since it results in a substantial decrease of the degree of conversion of the starting gases into sulphur and in a risk of a thermal destruction of the catalyst. The supply of the starting gases at a temperature below 120° C. (temperature of solidification of liquid sulphur) is difficult to carry out for purely technical reasons and undesirable, since it can result in clogging of the catalyst bed and the connecting gas ducts with solid sulphur.

The process for producing sulphur according to the present invention is performed in a catalyst bed divided along the cross-sections perpendicular to the direction of supply of the starting high-temperature gases into two or three parts. Carrying out the process in such a divided catalyst bed makes it possible to effect intermixing of the reaction gases between the catalyst bed parts. Furthermore, it is possible to conduct an intermediate cooling of the reaction gases and condensation of sulphur which enables shifting of the reaction's equilibrium towards the formation of elemental sulphur in the Claus reaction.

The above-mentioned reaction gases are fed into at least one part of the catalyst bed at a temperature below the dew point of sulphur (120°–160° C.) to ensure a high degree of conversion and in at least one of such parts of the catalyst bed the direction of flow of the gases is periodically reversed so that the reaction rate in this part of the catalyst bed is not reduced by inactivation of the catalyst by the condensing sulphur. It is undesirable to supply the starting gases at a temperature above 160° C. into those parts of the catalyst bed where the process is conducted at a temperature below the dew point of sulphur, since this results in an increased mean temperature of the reaction and in impaired condensation of sulphur upon intermediate cooling of the gas (wherefore the concentration of sulphur vapours is increased at the inlet of the gas to the above-mentioned parts of the catalyst bed) thus resulting in shifting of the chemical equilibrium towards a lower degree of conversion of the starting gases into sulphur.

The reversal of the direction of supply of the gases is effected when the difference of temperatures at the inlet and outlet of the part of the catalyst bed is equal to 50°–150° C. It is inexpedient to change the direction of flow of the gas at a difference of said temperatures of less than 50° C., since it results in rather frequent changes of directions of supply and, hence, in a reduced degree of conversion due to losses upon changing of the direction of flow of the gases (a portion of the gases will be going out of the catalyst bed without having reacted therein). The reversal of the direction of flow when the temperature difference is more than 150° C. is also undesirable, since it can result in a reduced rate of reaction of the process due to a too infrequent reversal of the direction of flow of the gases (after several such changes too much heat will be carried away from the catalyst bed along with the stream of the reaction gas which heat has been accumulated in the catalyst bed, whereby the above-mentioned temperature difference can never reach the value of 150° C.).

An embodiment of the process for producing sulphur according to the present invention resides in that the catalyst bed is divided along its cross-section perpendicular to the direction of the gas movement, into two parts and thereinbetween an intermediate cooling of the reaction gases and condensation of the produced sulphur is carried out. The gases are supplied into each part of the bed at a temperature below the sulphur dew point (120°–160° C.) and the reversal of the direction of flow of the gases in both parts of the catalyst bed is effected when the difference in temperatures of the reaction gas at the inlet and outlet of the second (along the path of the supplied gases) part of the catalyst bed reaches 50°–150° C. The reversal of the direction of flow of the gas when this temperature difference of less than 50° C. is reached also results in a lowered degree of conversion due to losses upon frequent alterations of the direction of flow of the reaction gas.

To obtain very high degrees of conversion (above 99%) in processing of high-concentration and high-moisture reaction gases, as well as for decomposition of sulphur-containing organic compounds present in the reaction gases, the process for the production of sulphur is effected into a catalyst bed divided in three parts; into the first (along the gas flow path) part of the catalyst bed the starting gases are supplied at a temperature of 300°–400° C., while into the second and third (along the gas flow path) parts of the catalyst bed—at a temperature of 120°–160° C. The reversal in the direction of flow of the gases in the second part of the catalyst bed is effected when the difference in temperatures of the gas at the inlet and outlet of this part of the catalyst bed reaches 50°–150° C.

If such reversal in the direction of the gas flow is not effected in the second part of the catalyst bed, the process therein will stop due to a complete deactivation of the catalyst by liquid sulphur.

In the first part of the catalyst bed there occurs decomposition of sulphur containing organic compounds at high temperatures, while in the third part of the catalyst bed condensation of sulphur is effected.

Furthermore, between the parts of the catalyst bed the reaction gases are cooled to condense sulphur. As the third (along the gas flow path) part of the catalyst bed is filled with liquid sulphur (which is determined by the drop of the difference in the gas temperature between the inlet and outlet of this part of the catalyst bed to a value of 0.1°–5° C.) the direction of flow of the gas is reversal in all parts of the catalyst bed so that the first (along the gas flow direction) part of the catalyst bed becomes the third part in the direction of the gas flow and vice versa. After such reversal in the direction of the gas flow in the first (along the gas flow path) part of the catalyst bed evaporation of sulphur condensed in this part is effected by a stream of hot starting gases, while in the third (along the reaction gas flow path) part of the catalyst bed cooling of the catalyst and condensation of sulphur take place. In this embodiment of the process said condensation of the entire amount of sulphur formed occurs only with an intermediate cooling of the gas, wherefore it is not necessary to carry out cooling of the gases both at the inlet of the first part of the catalyst bed and at the outlet from the third part of the catalyst bed.

The supply of the starting gases at a temperature of below 300° C. into the first part of the the three part catalyst bed is undesirable, since at such temperatures the rate of evaporation of liquid sulphur is decreased and sulphur-containing organic compounds decompose incompletely. The reversal in the direction of flow of the gases simultaneously in all parts of the catalyst bed as the difference of the gas temperature at the inlet and outlet of the third (along the flow path of the reaction gas) part of the catalyst bed of less than 0.1° C. will result in a lowered degree of conversion, since in this case the third part of the catalyst bed operates for some time under conditions of a complete deactivation of the catalyst, while the use of the minimum value of this difference above 5° C. will cause more frequent changes of the direction of gas supply and, hence, a decreased degree of conversion due to growing losses associated with frequent reversal of the direction of the gas flow.

It has been found that in the peripheral (end face) regions of the catalyst bed upon introduction of the reaction gases thereinto at a temperature below the dew point of sulphur the resulting sulphur is condensed and, hence, deactivation of the catalyst occurs, while said peripheral regions of the catalyst bed act as heat regenerators.

When sulphur is produced in a catalyst bed dividied into two parts with cooling of the gas in the zone between the parts of the catalyst bed and with condensation of sulphur thereinbetween, such regions exist in both parts of the catalyst bed. In the case of production of sulphur in a catalyst bed divided into three parts with cooling of the gas and condensation of sulphur in the zone between the parts of the catalyst bed such regions exist only in the second (along the path of the reaction gas flow) part of the catalyst bed. In both cases the formation, in the catalyst bed, of heat-regenerating regions can result in the necessity of increasing the total volume of the catalyst.

To avoid such necessity of increasing the catalyst volume according to the process of the present invention, it has been suggested to supply and withdraw the reaction gases from at least one part of the catalyst bed through beds of an inert material. A ratio of the inert material volume present in the catalyst bed to the volume of the catalyst bed should be equal to 1:0.5-2.

As the inert material use can be made of any material inert in respect of the reaction gas such as quartz, Raschig rings and the like.

Therefore, according to the present invention, sulphur formed during the reaction in the catalyst bed is condensed mainly on particles of the inert material which acts as the heat regenerator. Owing to the use of an inert material it is possible to reduce the amount of the catalyst required for carrying out the process and thus lower the cost of the catalyst which is far more expensive than the inert material. Carrying out the process at a volume of the inert material in a ratio of less than 1:2 to the catalyst volume is inadvisable, since in this case a certain portion of the catalyst is still deactivated by liquid sulphur. A volume of the inert material of more than 1:0.5 to the catalyst volume is also inexpedient, since under such conditions the reaction gases should be supplied into the catalyst bed under pressure to ensure contact of the reaction gases with the catalyst along the entire length of its bed.

In the case of presence of traces of oxygen in the starting reaction gase, on the catalyst surface sulphates can be formed which lower the catalyst activity up to a complete deactivation thereof so that the rate of sulphatization of the catalyst is increased with decreasing of temperature in the reaction zone. When the process for the production of sulphur is conducted at a reaction temperature within the range of from 240° to 300° C. many types of catalysts employed in the Claus process are subjected to deactivation with sulphates.

To ensure a high degree of conversion according to the present invention the process for producing sulphur is conducted in the following manner: after every 1,000–10,000 periods of reversal of the direction of flow of the reaction gases, in one or more parts of the catalyst bed the catalyst regeneration is carried out by additional changings of the direction of the gas flow when the difference of temperatures at the inlet and outlet of the reaction gases from the above-mentioned parts of the catalyst bed reaches 1°–25° C. and by way of increasing the linear velocity of the gas movement. The duration of the period between reversal of the direction of the gas supply is substantially reduced, wherefore the temperature in the reaction zone of the catalyst bed is increased to 350°–450° C. (there occurs "pumping" of heat in a given portion of the catalyst bed owing to the fact that the amount of the heat blown by the gases out of the catalyst bed by the gases is lower than the amount of heat evolving in the chemical reaction). At temperatures of 350°–450° C. in the reaction zone there occurs a thermal decomposition of sulphates which results in regeneration of the catalyst. Duration of the regeneration period may be equal to 10–100 minutes.

It is inadvisable to conduct regeneration of the catalyst at a temperature below 350° C., since at such temperatures the regeneration rate is too low, while at temperatures above 450° C. a thermal destruction of the catalyst can occur.

It is inadvisable to change the direction of the reaction gas flow during the process of regeneration of the catalyst upon achieving the difference of temperatures of the reaction gas at the inlet and outlet of the catalyst bed above 25° C., since in this case temperature in the reaction zone do not reach 350° C.

The duration of the regeneration period of less than 10 minutes is insufficient for restoration of the catalyst activity, while that of more than 100 minutes results in a lowered mean degree of conversion of the starting gases into sulphur due to a reduced degree of conversion during the period of regeneration (because of elevation of the reaction temperature).

The rate of regeneration of the catalyst is favourably influenced by carrying out the process for producing sulphur from a reaction gas with an increased ratio of volume concentrations of $H_2S$ and $SO_2$ equal to 3:1, but in this case the degree of conversion of the starting gases into sulphur is substantially decreased, since the excessive amount of hydrogen sulphide does not take part in the reaction.

PREFERRED EMBODIMENTS

For a better understanding of the present invention, some specific examples illustrating its particular embodiments are given hereinbelow.

Example 1

Elemental sulphur is produced in a catalyst bed ($\gamma$-alumina) divided into two parts between which parts cooling of the reaction gas and condensation of sulphur is effected. The temperature of the reaction gas at the inlet into both parts of the catalyst bed is 120° C., the reaction gas composition at the inlet into the first (along the path of the gas flow) part of the catalyst bed is: 10% of $H_2S$, 5% of $SO_2$, 75% of $N_2$. When the difference of the gas temperatures at the inlet and outlet of the second part of the catalyst bed of 10° C. is reached, the direction of flow of the gases in both parts of the catalyst bed is reversed.

The time between reversal of the direction of the gas supply is about 30 minutes, while a means degree of filling of the catalyst bed with liquid sulphur along its length is about 50%. The average, in time, degree of conversion of the starting gases into sulphur is 98.8%.

Example 2

Elemental sulphur is produced under conditions similar to those described in Example 1, except for the composition of the starting gases: 5% of $H_2S$, 2.5% of $SO_2$, 20% of $H_2O$, 72.5% of $N_2$. The average degree of conversion is 98.6%. When the process for producing sulphur is conducted under the conditions specified in SU, A, No. 911852, all other conditions being equal, the degree of conversion is 90%.

Example 3

Elemental sulphur is produced under conditions similar to those described in Example 1 hereinbefore. However, the reversal of the direction of flow of the reaction gases into both parts of the catalyst bed is effected when the difference in the reaction gas temperatures at the inlet and outlet of the second part of the catalyst bed reaches 150° C. The duration of the period between reversing of the direction of flow of the gas supply is 50 minutes. The average degree of filling of the catalyst bed with liquid sulphur is 65%, the degree of conversion is 98.6%.

Example 4

Elemental sulphur is produced under conditions similar to those of Example 3.

However, the difference in temperatures of the reaction gas at the inlet and outlet of the second part of the catalyst bed is equal to 50° C. The duration of the period between reversing of the direction of flow of the reaction gas is 10 minutes, the average content of liquid sulphur is about 10%. Due to elevation of temperature in the reaction zone the conditions of chemical equilibrium are impaired, the maximum temperature in the catalyst bed is about 350° C., the degree of conversion is 96.5%.

Example 5

Elemental sulphur is produced in a catalyst bed divided into two parts and the reaction gas is intermixed thereinbetween. The gas temperature at the inlet of the first part of the catalyst bed is 120° C., the reaction gas has the following composition: 5% of $H_2S$, 2.5% of $SO_2$, 92.5% of $N_2$. The reversing of in the direction of flow of the starting gases is effected when the difference in the temperatures of the reaction gas at the inlet and outlet of the second part of the catalyst bed is 50° C. The duration of the period between changings of the direction of supply of the reaction gases is 40 minutes, the degree of conversion is 97.1%.

Example 6

Elemental sulphur is obtained under conditions similar to those of Example 1. However, into both parts of the catalyst bed the reaction gas is introduced and withdrawn therefrom through beds of an inert material (quartz) with the ratio of said beds to the catalyst volume of 1:1. The degree of conversion of 98.8% is attained at the amount of the catalyst which is by two times smaller due to the use of the inert material.

Example 7

Elemental sulphur is produced under conditions similar to those specified in Example 6 hereinabove, except that the ratio of volumes of the inert material beds and the catalyst volume is 1:2 respectively. The degree of conversion is 98.8%, a portion of the catalyst is deactivated with liquid sulphur.

Example 8

Elemental sulphur is produced under conditions similar to those of Example 7.

The ratio of volumes of the inert material beds to the catalyst volume is 1:0.5. The degree of conversion is 98.2%.

Example 9

Elemental sulphur is produced under conditions similar to those specified in Example 1.

After 5,000 periods between reversing of the direction of flow of the reaction gases the degree of conversion of sulphur dropped to 91.5% which is due to deactivation of the catalyst because of its sulphatization as a result of presence of oxygen in the reaction gases.

For regeneration of the sulphatized catalyst, for 60 minutes reversing of the direction of flow of the reaction gases are effected upon achieving the difference in the temperatures of the reaction gas at the inlet and outlet of the second part of the catalyst bed of 10° C.; in addition, the linear velocity of the gases is also increased. The duration of the period between reversing of the direction of flow of the reaction gases is shortened to 2 minutes; the degree of conversion within the period of regeneration of the catalyst drops to 87.5% the maximum temperature in the catalyst bed reaches 400° C. The average degree of conversion with the account of regeneration is 98.3%. When the process is conducted without regeneration after 15,000 of the above-mentioned periods the degree of conversion was lowered to 65.3% due to sulphatization of the catalyst, while after 20,000 such periods the process stops.

Example 10

Elemental sulphur is obtained under conditions similar to those described in the foregoing Example 9. The reversing in the direction of flow of the gases is carried out when the difference in the temperatures of the gases at the inlet and outlet of the second part of the catalyst bed becomes equal to 1° C. The duration of the period between reversing the direction of flow of the reaction gases is 1 minute; the maximum temperature in the catalyst bed is 450° C., the degree of conversion with the account of losses in changings of the direction of the gas flow is 35.6%. The duration of regeneration is 10 minutes.

Example 11

Elemental sulphur is produced with the use of a catalyst bed divided into three parts.

In the zones between the parts of the catalyst bed the reaction gas is cooled and the formed sulphur is condensed. Into the first part of the catalyst bed the reaction gas is supplied at the temperature of 350° C., into the second and third parts of the catalyst bed—the gas is supplied at temperature of 120° C. At the inlet of the first part of the catalyst bed the reaction gas has the following composition: 10% of $H_2S$, 5% of $SO_2$, 20% of $H_2O$ and 65% of $N_2$. The direction of flow of the reaction gas into the second part of the catalyst bed is reversed when the difference in the gas temperatures at the inlet and outlet of this part of the catalyst bed reaches 100° C. The direction of the reaction gas flow through the catalyst bed on the whole is reversed with dropping difference in the gas temperatures at the inlet and outlet of the third (along the path of the reaction gas flow) part of the catalyst bed to the value of 3° C. The degree of conversion of the starting reaction gases into sulphur is 99.6%.

Reversing the direction of the gas flow into the second part of the catalyst bed is effected after every 15 minutes and in all three parts of the catalyst bed—after every 30 hours. In the gases effluent from the catalyst bed no COS and $CS_2$ are detected.

Example 12

Elemental sulphur is obtained under conditions similar to those described in Example 11.

The reaction gas temperature at the inlet to the first part of the catalyst bed is 300° C.

At the outlet from the catalyst bed traces of COS and $CS_2$ are present in the reaction gases due to an incomplete decomposition of these compounds in the first part of the catalyst bed because of a temperature drop in the catalyst. Nevertheless, the degree of conversion is 99.6%.

Example 13

Elemental sulphur is produced under conditions similar to those described in Example 11 hereinbefore.

Into the first part of the catalyst bed the reaction gas is fed at the temperature of 400° C. Due to a thermal destruction of the catalyst its service life is shortened. Nevertheless, the degree of conversion is 99.6%.

Example 14

Elemental sulphur is obtained under conditions similar to those of Example 11.

The reversing of the direction of flow of the reaction gases into the whole of the catalyst bed is effected when the difference in the gas temperatures at the inlet and outlet of the third part of the catalyst bed reaches the value of 5° C. The degree of conversion is 99.5%.

Example 15

Elemental sulphur is obtained under conditions similar to those specified in the foregoing Example 14.

The gas flow was reversed when the difference in the reaction gas temperatures at the inlet and outlet of the third part of the catalyst bed was 0.1° C. The degree of conversion was 99.5%.

Example 16

Elemental sulphur is obtained under conditions similar to those described in Example 9.

The difference in the reaction gas temperatures at the inlet and outlet of the third part of the catalyst bed is 0° C. (within the range of the measurement error). The degree of conversion is 98.7%.

Industrial Applicability

The present invention is useful in the petrochemical industry, gas processing, metallurgy and some other industries, in the production of sulphuric acid, as well as in purification of the off-gases from toxic sulphur compounds which is necessary from the ecological standpoint.

What is claimed is:

1. A process for producing elemental sulfur from sulfur dioxide gas and hydrogen sulfide gas by introducing said gases at a temperature not lower than 120° C. into a catalyst bed, the direction of flow of said gases being reversed periodically, the resulting gaseous sulfur being subsequently removed from the catalyst bed and condensed, the process being conducted in a catalyst bed divided into three parts in a plane perpendicular to the direction of flow of the gases, wherein into the first part of the catalyst bed, along the flow path of the gases, said gases are fed at a temperature of 300° C.–400° C.; into the second and third parts of the catalyst bed said gases are fed at a temperature of 120° C.–160° C., wherein intermixing and/or cooling of said gases, removal of gaseous sulfur, and condensation of the gaseous sulfur are effected between at least two parts of the catalyst bed; at least into one of the parts of the catalyst bed said gases are fed at a temperature below the dew point of sulfur; said reversal of the direction of flow of said gases being carried out in the second part of the catalyst bed when the temperature difference of said gases between the inlet and the outlet of said second part of said catalyst bed is equal to 50° C.–150° C.; the reversal of the direction of flow of said gases into all said parts of said catalyst bed being effected when the difference in the gas temperature between the inlet and the outlet from the third part of the catalyst bed along the flow path of the gases is in the range of 0.1° C.–5° C.

2. A process according to claim 1, wherein the inlet gas and the outlet gas of at least one part of said catalyst bed are passed through beds of an inert material, the ratio of the volume of the beds of inert material to the volume of the catalyst bed being 1:0.5–2.

3. A process according to claim 2, wherein said inert material is quartz.

* * * * *